(12) United States Patent
Memon et al.

(10) Patent No.: US 9,467,495 B2
(45) Date of Patent: Oct. 11, 2016

(54) TRANSFERRING ASSETS VIA A SERVER-BASED CLIPBOARD

(71) Applicant: Adobe Systems Incorporated, San Jose, CA (US)

(72) Inventors: Amir Hussain Memon, Fremont, CA (US); Geoffrey Dowd, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 489 days.

(21) Appl. No.: 13/839,441

(22) Filed: Mar. 15, 2013

(65) Prior Publication Data

US 2014/0280755 A1    Sep. 18, 2014

(51) Int. Cl.
*G09G 5/00* (2006.01)
*H04L 29/08* (2006.01)

(52) U.S. Cl.
CPC .......... *H04L 67/02* (2013.01); *H04L 67/1097* (2013.01); *H04L 67/2823* (2013.01); *H04L 67/36* (2013.01)

(58) Field of Classification Search
None
See application file for complete search history.

(56) References Cited

U.S. PATENT DOCUMENTS

| | | | |
|---|---|---|---|
| 5,973,677 A | 10/1999 | Gibbons | |
| 6,563,494 B1 | 5/2003 | Eichstaedt et al. | |
| 6,648,536 B1 | 11/2003 | Bellue | |
| 8,438,640 B1 * | 5/2013 | Vaish et al. | 726/22 |
| 8,841,881 B2 | 9/2014 | Failing | |
| 8,878,823 B1 | 11/2014 | Kremin et al. | |
| 2001/0001430 A1 | 5/2001 | Ely et al. | |
| 2003/0097410 A1 * | 5/2003 | Atkins | H04L 29/06 709/206 |
| 2006/0001654 A1 | 1/2006 | Smits | |
| 2006/0101064 A1 * | 5/2006 | Strong | G06F 17/30038 |
| 2006/0108976 A1 | 5/2006 | Chen | |
| 2006/0291701 A1 | 12/2006 | Tanaka | |
| 2007/0143379 A1 * | 6/2007 | i Dalfo | G06F 8/61 |
| 2007/0174246 A1 * | 7/2007 | Sigurdsson | G06F 17/30176 |

(Continued)

FOREIGN PATENT DOCUMENTS

| | | |
|---|---|---|
| EP | 2146414 A1 | 1/2010 |
| WO | 9320536 A1 | 10/1993 |

OTHER PUBLICATIONS

WSJ Staff; Samsung Unveils Tablet, Readies Phone; The Wall Street Journal; Digits Technology news and Insights; Feb. 25, 2013, 4 pages.

(Continued)

*Primary Examiner* — Kyle Zhai
(74) *Attorney, Agent, or Firm* — Shook Hardy & Bacon, L.L.P.

(57) ABSTRACT

Systems and methods are provided for transferring assets via a server-based clipboard. In one embodiment, an asset is stored on a server system. The asset is transmitted to the server system from a first application in response to a first input to the first application from an input device. A request for the asset is received from a second application in response to a second input to the second application from the input device. The second application is different from the first application. A rendering attribute is identified for the asset. The rendering attribute has a first value that is specific to rendering the asset via the first application. The rendering attribute is modified to have a second value that is specific to rendering the asset via the second application. The asset is provided with the rendering attribute having the second value specific to the second application.

20 Claims, 9 Drawing Sheets

(56) References Cited

U.S. PATENT DOCUMENTS

| | | | |
|---|---|---|---|
| 2008/0046425 A1 | 2/2008 | Perski | |
| 2008/0169132 A1 | 7/2008 | Ding et al. | |
| 2008/0189659 A1* | 8/2008 | Krutzler | 715/838 |
| 2009/0175491 A1 | 7/2009 | Charpentier | |
| 2009/0204681 A1* | 8/2009 | Sun | H04L 12/587 709/206 |
| 2009/0244015 A1 | 10/2009 | Sengupta et al. | |
| 2009/0251432 A1 | 10/2009 | Wang et al. | |
| 2009/0287841 A1 | 11/2009 | Chapweske et al. | |
| 2010/0021022 A1 | 1/2010 | Pittel et al. | |
| 2010/0079404 A1 | 4/2010 | Degner et al. | |
| 2010/0131675 A1 | 5/2010 | Pan | |
| 2010/0164434 A1 | 7/2010 | Cacioppo et al. | |
| 2010/0216107 A1 | 8/2010 | Hines | |
| 2010/0289812 A1* | 11/2010 | Kobayashi et al. | 345/590 |
| 2010/0318534 A1 | 12/2010 | Kaufman et al. | |
| 2011/0279081 A1 | 11/2011 | Cacioppo et al. | |
| 2011/0316472 A1 | 12/2011 | Han et al. | |
| 2012/0079578 A1 | 3/2012 | Dachiraju et al. | |
| 2012/0105362 A1 | 5/2012 | Kremin et al. | |
| 2012/0226983 A1 | 9/2012 | Goldenberg et al. | |
| 2013/0106722 A1 | 5/2013 | Shahparnia et al. | |
| 2013/0141456 A1* | 6/2013 | Sokolov et al. | 345/620 |
| 2013/0154956 A1 | 6/2013 | Tudosoiu | |
| 2013/0234999 A1 | 9/2013 | Kuno | |
| 2013/0278550 A1 | 10/2013 | Westhues | |
| 2014/0188978 A1 | 7/2014 | Ng et al. | |
| 2014/0253467 A1* | 9/2014 | Hicks et al. | 345/173 |
| 2014/0253469 A1 | 9/2014 | Hicks et al. | |

OTHER PUBLICATIONS http://www.tenonedesign.com/connect.php; last accessed on Apr. 3, 2013, 7 pages.

Non-Final Office Action dated May 7, 2015 in U.S. Appl. No. 13/856,070, 13 pages.

Non-Final Office Action dated Sep. 18, 2014 in U.S. Appl. No. 13/835,959, 21 pages.

Final Office Action dated Feb. 12, 2015 in U.S. Appl. No. 13/835,959, 23 pages.

Non-Final Office Action dated May 4, 2015 in U.S. Appl. No. 13/855,997, 12 pages.

First Action Interview Pre-Interview Communication dated Jun. 26, 2015 in U.S. Appl. No. 13/840,746, 6 pages.

Internet Article, Review: Samsung Galaxy Note 10.1 tablet is mightier with pen—CNN.com, Harry McCracken, 3 pgs., Aug. 17, 2012 http://cpf.cleanprint.net/cpd/cpf?action=print&type=filePrint &key=cnn&url=http%3A%2F.

Non-Final Office Action dated Jun. 20, 2014 in U.S. Appl. No. 13/572,231, 19 pages.

Final Office Action dated Nov. 6, 2014 in U.S. Appl. No. 13/572,231, 21 pages.

Non-Final Office Action dated Mar. 5, 2015 in U.S. Appl. No. 13/572,231, 21 pages.

Notice of Allowance dated Jul. 8, 2015 in U.S. Appl. No. 13/572,231, 8 pages.

Non-Final Office Action dated Jul. 17, 2015 in U.S. Appl. No. 13/841,089, 29 pages.

Final Office Action dated Nov. 12, 2015 in U.S. Appl. No. 13/856,070, 15 pages.

Final Office Action dated Nov. 12, 2015 in U.S. Appl. No. 13/840,746, 26 pages.

Notice of Allowance dated Aug. 31, 2015 in U.S. Appl. No. 13/855,997, 5 pages.

Notice of Allowance dated Mar. 7, 2016 in U.S. Appl. No. 13/856,070, 5 pages.

Final Office Action dated Mar. 17, 2016 in U.S. Appl. No. 13/841,089, 29 pages.

Non-Final Office Action dated Mar. 22, 2016 in U.S. Appl. No. 13/840,746, 31 pages.

Final Office Action dated Jul. 28, 2016 in U.S. Appl. No. 13/840,746, 29 pages.

Non-Final Office Action dated Aug. 10, 2016 in U.S. Appl. No. 13/835,959, 25 pages.

\* cited by examiner

TRANSFERRING ASSETS VIA A SERVER-BASED CLIPBOARD

CROSS REFERENCE TO RELATED APPLICATIONS

This application is related to concurrently-filed U.S. patent application Ser. No. 13/840,746, entitled "Secure Cloud-Based Clipboard For Touch Devices," by Dowd et al., which is incorporated by reference herein in its entirety.

TECHNICAL FIELD

This disclosure relates generally to computer-implemented methods and systems and more particularly relates to providing a server-based clipboard for transferring assets and other electronic content.

BACKGROUND

Users working with multiple devices in a collaborative environment may create artwork or other electronic content on various devices, such as a smart phone, a desktop computer, a tablet computer, etc. Working with multiple devices may require quickly switching between the devices to leverage the strengths of each device. For example, a user may use an application such as Adobe® Ideas being executed on a tablet computer to sketch a drawing. The user may then transfer the sketch to an instance of an additional application on a different computing device, such as an instance of Adobe® Illustrator being executed on a desktop computer. The user may transfer the sketch back to the tablet computer for further refinement of the sketch.

Prior solutions for transferring data between applications executed on different devices may include manually transferring files via a network, such as a cloud service. Such solutions may involve multiple steps, thereby slowing the workflow of a user. Such solutions may also present shortcomings in transferring electronic content between multiple applications executed on the same computing device. For example, a tablet computer may include multiple applications that are strictly sandboxed from one another. A first application may be focused on certain types of drawings or other electronic content and another application may be focused on types of drawings or other electronic content. A user may wish to quickly switch between the two applications to transfer data.

SUMMARY

In one embodiment, a method is executed by a server system. The embodiment involves storing an asset. The asset is transmitted to the server system from a first application in response to a first input to the first application from at least one input device. The embodiment also involves receiving a request for the asset from a second application that is sent in response to a second input to the second application from the input device. The second application is different from the first application. The embodiment also involves identifying a rendering attribute for the asset. The rendering attribute has a first value that is specific to rendering the asset via the first application. The embodiment also involves modifying the rendering attribute to have a second value that is specific to rendering the asset via the second application. The embodiment also involves providing the asset to the second application. The provided asset has the rendering attribute with the second value specific to the second application.

In another embodiment, a method is executed by a computing device. The embodiment involves identifying an input device in communication with the computing device. The embodiment also involves establishing a connection over a data network to a server system. The embodiment also involves performing one or more operations in response to an input by the input device. The operations include identifying a position for rendering an asset via an application executed at the computing device, obtaining the asset from the server system via the connection over the data network, and providing the asset obtained from the server system for display via the application at the position.

In another embodiment, a method is executed by a computing device. The embodiment involves identifying a first input device in communication with the computing device. The embodiment also involves establishing a first connection over a data network to a server system. The embodiment also involves performing one or more operations in response to an input by the input device. The operations include identifying an asset for transmission to the server system via the first connection. The asset is rendered by a first application executed at the computing device. The operations also include identifying a second input device that is discoverable by the first input device on a data network. The operations also include providing the asset to the server system via the first connection. The operations also include providing a network identifier for the asset to the second input device. The asset is retrievable using the network identifier by a second computing device in communication with the second input device via a second network connection These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings, where.

DETAILED DESCRIPTION

Figure 1:
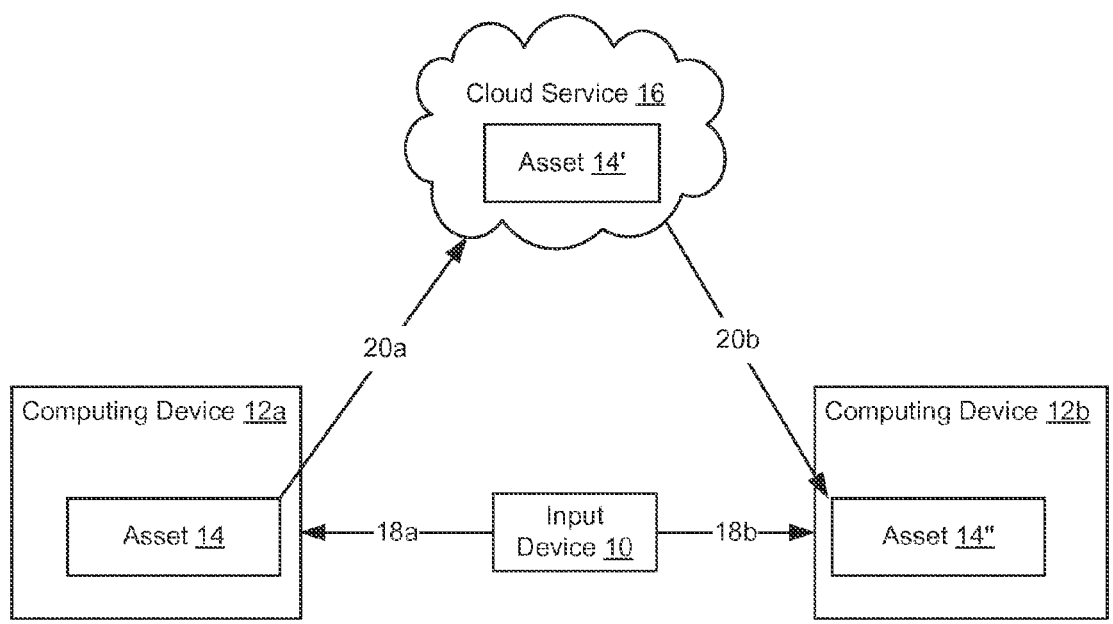
FIG. 1 is a modeling diagram illustrating an example flow of communications between an input device and computing devices for sharing an asset via a cloud service.

Computer-implemented systems and methods are disclosed for providing a server-based clipboard for transferring assets. A server-based clipboard can allow assets or other electronic content to be moved between applications and/or devices via a single gesture at each application or device rather than via several gestures at each application or device for transmitting the assets.

The following non-limiting example is provided to help introduce the general subject matter of certain embodiments. A server-based clipboard can store transient clipboard data received from a first application for a period of time before the clipboard data is provided to a second application. On a first device, a user accessing a first application can perform a gesture to initiate copying of assets or other electronic content in the first application. A non-limiting example of an asset to be copied is an image asset, such as vector graphics data or raster graphics data. A non-limiting example of a gesture to initiate copying is a touch input or other input from an input device, such as a stylus. The data representing the asset to be copied can be serialized for transmission to a server system providing a clipboard. A non-limiting of serializing asset data for transmission includes converting the asset data into an Extensible Markup Language ("XML") format, such as a Flash XML Graphics ("FXG") format. The first computing device asynchronously transmits the asset to the clipboard provided by the server system. In some embodiments, the clipboard can be accessed by computing devices via an instance of a cloud-based service executing on the server system. The cloud-based service can save the asset data to the clipboard by, for example, performing a memory caching operation that stores the data to the clipboard. The cloud service can notify one or more subscribing applications subscribing to the cloud service that the asset is available for retrieval from the server-based clipboard. A second computing device at which a subscribing application is executed can access the clipboard via the cloud service. The subscribing application can retrieve a copy of the asset from the clipboard and store the asset in a memory of a second computing device.

A server-based clipboard can provide one or more advantages for devices or applications in the transfer of assets or other electronic content. For example, an image or other asset copied from a first device having a screen with a given size and/or dimensions, such as a smart phone, can be skewed, scaled, or otherwise modified for display on a second device having a screen with a different size and/or dimensions, such as a tablet computer or desktop computer. Processing for the clipboard can be performed on the server system, thereby providing for faster performance than non-server based clipboard applications.

As used herein, the term "electronic content" is used to refer to any type of media that can be rendered for display or use at a computing system or other electronic device. Electronic content can include text or multimedia files, such as images, video, audio, or any combination thereof. Electronic content can also include application software that is designed to perform one or more specific tasks at a computing system.

As used herein, the term "asset" is used to refer to an item of electronic content included in a multimedia object, such as text, images, videos, or audio files. As used herein, the term "image asset" is used to refer to a digital image, vector graphics, raster graphics, etc. As used herein, the term "video asset" is used to refer to a video file included in a multimedia object. As used herein, the term "text asset" is used to refer to text included in a multimedia object.

As used herein, the term "clipboard" is used to refer to a location in a memory device accessible via multiple applications that provides short-term data storage and/or data transfer among documents or applications. Data transfer between documents and applications can be performed via interface commands for transferring data such as cutting, copying, and/or pasting operations. For example, a clipboard can provide a temporary data buffer that can be accessed from most or all programs within a runtime environment. In some embodiments, a clipboard can allow a single set of data to be copied and pasted between documents or applications. Each cut or copy operation performed on a given set of data may overwrite a previous set of data stored on the clipboard. In other embodiments, a clipboard can allow multiple sets of data to be copied to the clipboard without overwriting one another.

As used herein, the term "cloud service" is used to refer to one or more computing resources, including computing systems and/or applications, that can be provided as an online service via a data network. The collection of computing systems and/or hardware can be represented as a single service. The cloud service can provide a digital hub for browsing, creating, sharing, and otherwise using electronic content using one or more applications provided via the cloud service.

In accordance with one embodiment, a cloud application executed on a server system can perform one or more operations on a copied asset before providing the asset to a subscribing application. For example, the cloud application can receive an asset in response to a first application and/or device receiving a first input and receive a request for the asset in response to a second application and/or device receiving a second input. The cloud application can identify a rendering attribute for the asset. Non-limiting examples of rendering attributes can include one or more color attributes of the asset, a color scheme for the asset, an aspect ratio for the asset, attributes based on an operating system of a device providing and/or receiving the asset, attributes based on a display screen size, attributes based on a display screen resolution, and the like. The rendering attribute has a first value that is specific to rendering the asset via the first application, such as a scaling factor used by the first application or a screen size of a first device executing the first application. The cloud application can modify the rendering attribute to have a second value that is specific to rendering the asset via the second application. For example, the cloud application can scale the asset to include a scaling factor used by the second application or to fit a screen size of a second device executing the second application. The cloud application can provide the asset to the second application. The provided asset has the rendering attribute with the second value specific to the second application.

In some embodiments, the cloud application can identify a rendering attribute of the asset based on metadata provided by an application copying the asset to the server-based clipboard. As used herein, the term "metadata" is used to refer to information associated with (and generally but not necessarily stored with) an asset or other electronic content item that provides information about a feature of the electronic content item. Metadata may describe a location or identification of electronic content. Non-limiting examples of metadata for an electronic content item can include a title, author, keywords, and the like. Metadata may also describe a relationship between a first electronic content item and a second electronic content item, such as how the first and second electronic content items can be combined and sequenced for a multimedia presentation. Metadata can also describe when and how an electronic content item was created, a file type and other technical information for the electronic content item, and/or access rights for the electronic content item. In some embodiments, metadata includes data included in the electronic content item that is not displayed by an application using the electronic content item.

In another embodiment, an application executed on a computing device to perform a copying operation can identify one or more other input devices or other computing devices that may receive a copied asset from the server-based clipboard. The computing device can identify an asset that is rendered by a first application executed at the computing device, such as a tablet computer. The computing device can select the asset for transmission to the server system in response to an input from a first input device, such as touch input from a first stylus. The computing device can copy the asset to a server-based clipboard provided by the server system. The computing device can obtain a network identifier or other unique identifier for the asset stored to the server-based clipboard. For example, the application providing the asset to the server system can obtain a uniform resource locator ("URL") or other identifier by which the asset as stored on the server-based clipboard can be accessed. The computing device can identify at least one second input device, such as a second stylus, that is discoverable by the first input device on the data network and/or another wireless network accessible by the computing device. The computing device can provide a copy of the identifier to the second input device. The second input device can provide a touch input or other input and the identifier to a second computing device. The asset can be retrieved by the second computing device, such as another tablet computer or a laptop computer, via a second connection to the server system using the identifier.

Any suitable process can be used for retrieving the asset via the identifier provided by an application performing a copying operation. In one non-limiting example, a cloud service may verify that a second computing device is authorized to retrieve the asset from the server-based clipboard based on the second computing device having the identifier. The second computing device may request the asset from a cloud service in response to a touch input or other input from the second input device. The request for the asset provided to the server system may include the identifier stored to the second input device. The cloud service may verify that the second computing device is authorized to retrieve the asset from the server-based clipboard based on the second computing device providing the identifier in the request for the asset.

In another embodiment, an application can perform one or more pasting operations using a server-based clipboard. For example, a computing device can identify an input device and establish a connection over a data network to a server system providing the server-based clipboard. The computing device can respond to a touch input or other input by identifying at least one position for rendering an asset via an application executed at the computing device. The computing device can obtain the asset from the server system via the connection over the data network. The computing device can provide the asset obtained from the server system for display via the application at the at least one position.

In additional or alternative embodiments, a server-based clipboard can be used to transfer assets or other data via copy and paste operations between applications executed on the same computing device. For example, multiple applications on a common computing device may be unable to directly transfer assets or otherwise communicate via the resources of the computing device. A first application executing on the common computing device can establish a first connection with the server system. The first application can access a server-based clipboard via the first connection. The first application can copy an asset to the server-based clipboard. A second application executing on the common computing device can establish a second connection with the server system. The second application can access the server-based clipboard via the second connection. The second application can paste the asset from the server-based clipboard. The server-based clipboard can thus provide copy/paste functionality between applications on a common computing device that cannot directly communicate with one another, such as two or more sandboxed applications.

As used herein, the term "sandboxing" is used to refer to one or more security processes executed by a computing device to prevent communication between two or more applications executed on the computing device. For example, each of multiple applications may be executed in a respective sandbox that is a container or other logical object within an operating system. A sandbox container can constrain the respective application from accessing shared resources, such as a shared file system or other memory locations accessible by multiple applications. In some embodiments, the sandbox container can provide access to a limited subset of the shared resources of the operating system, such as a portion of a shared filed system. A clipboard function provided by the computing device can be a shared resource that is excluded from a sandbox container.

Referring now to the drawings, FIG. 1 is a modeling diagram illustrating an example flow of communications between an input device 10 and computing devices 12a, 12b for sharing an asset 14 via a cloud service 16. The computing devices 12a, 12b can include any type of computing devices, such as tablet computers, smart phones, laptop computer, desktop computers, etc. In some embodiments, the computing devices 12a, 12b can each be the same type of computing device. In other embodiments, the computing devices 12a, 12b can be different types of computing devices.

The computing devices 12a, 12b can each be in communication with the cloud service 16 via a data network, such as the Internet. In some embodiments, the computing devices 12a, 12b can access a common collaborative environment provided by the cloud service. In other embodiments, the computing devices 12a, 12b can each access the cloud service independently from one another.

The computing device 12a can render an asset 14 for display. An asset can include an item of electronic content, such as (but not limited to) an image or vector graphic. The computing device 12a can render the asset 14 via any suitable application, such as (but not limited to) Adobe® Ideas or Adobe® Illustrator.

Each of the computing devices 12a, 12b can be configured to receive inputs from the input device 10 for selecting, modifying, or otherwise using assets. The input device 10 can include any suitable device configured for providing input data and/or control signals to the computing devices 12a, 12b. A non-limiting example of an input device 10 is a stylus configured to provide touch inputs to a touch screen device.

The cloud service 16 can provide a server-based clipboard for moving assets between the computing devices 12a, 12b. For example, the computing device 12a can receive a touch input 18a from the input device 10 that initiates copying of the asset 14 to the cloud service 16. The touch input 18a can direct the computing device 12a to transmit a copy of the asset 14 to the cloud service 16. The computing device 12a can transmit the copy of the asset 14 to the cloud service 16 via the communication 20a. The cloud service 16 can store the copy as asset 14'. The computing device 12b can receive a touch input 18b from the input device 10 that initiates pasting of the asset 14' from the cloud service 16 to an application executing at the computing device 12b. The touch input 18b can direct the computing device 12b to request a copy of the asset 14' from the cloud service 16. The cloud service 16 can transmit a copy of the asset 14' to the computing device 12b via the communication 20b. The computing device 12b can store the copy as asset 14".

Figure 2:
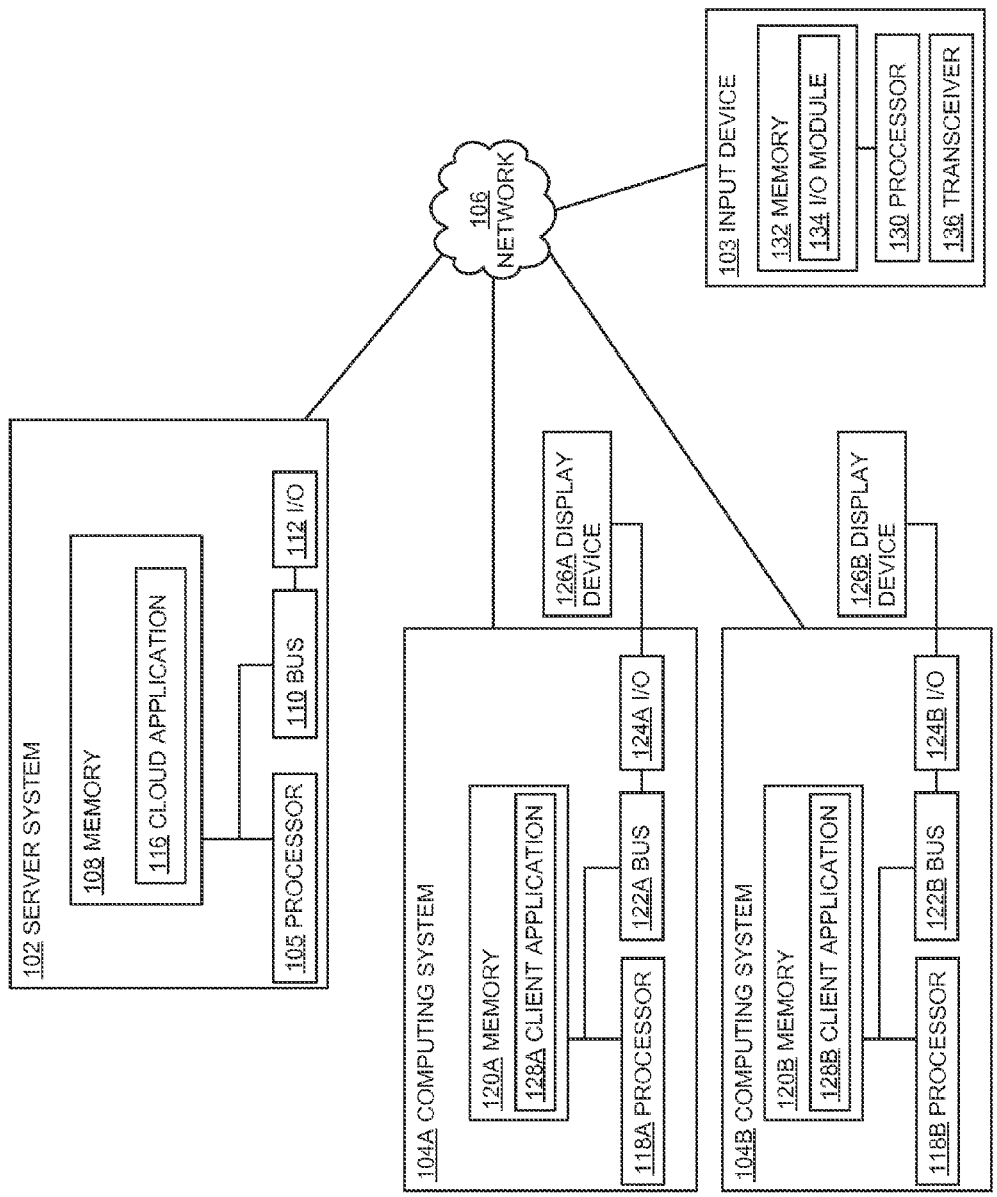
FIG. 2 is a block diagram depicting example computing systems for implementing certain embodiments.

FIG. 2 is a block diagram depicting example computing systems for implementing certain embodiments. The example computing systems include a server system 102 and computing systems 104a, 104b in communication via a data network 106.

The server system 102 includes a processor 105. The processor 105 may include a microprocessor, an application-specific integrated circuit ("ASIC"), a state machine, or other suitable processing device. The processor 105 can include any number of computer processing devices, including one. The processor 105 can be communicatively coupled to a computer-readable medium, such as a memory 108. The processor 105 can execute computer-executable program instructions and/or accesses information stored in the memory 108. The memory 108 can store instructions that, when executed by the processor 105, cause the processor to perform operations described herein.

A computer-readable medium may include (but is not limited to) an electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

The server system 102 may also include a number of external or internal devices, such as input or output devices. For example, the server system 102 is shown with an input/output ("I/O") interface 112. A bus 110 can also be included in the server system 102. The bus 110 can communicatively couple one or more components of the server system 102.

Each of the computing systems 104a, 104b includes respective processors 118a, 118b. Each of the processors 118a, 118b may include a microprocessor, an ASIC, a state machine, or other processor. Each of the processors 118a, 118b can include any of a number of computer processing devices, including one. Such a processor can include or may be in communication with a computer-readable medium. As depicted in FIG. 2, each of the processors 118a, 118b is communicatively coupled to respective memories 120a, 120b. Each of the processors 118a, 118b respectively executes computer-executable program instructions and/or accesses information stored in the memories 120a, 120b. The memories 120a, 120b store instructions that, when executed by the processor, cause the processor to perform one or more operations described herein.

The computing systems 104a, 104b may also comprise a number of external or internal devices such as a mouse, a CD-ROM, DVD, a keyboard, a display, audio speakers, one or more microphones, or any other input or output devices. For example, each of the computing systems 104a, 104b is respectively shown with I/O interfaces 124a, 124b and display devices 126a, 126b. A non-limiting example of a display device is a computer monitor or computer screen, such as a touch screen. Although FIG. 2 depicts the display devices 126a, 126b as separate devices coupled to the computing systems 104a, 104b, the display devices 126a, 126b can be respectively integrated into the computing systems 104a, 104b.

Buses 122a, 122b can be respectively included in the computing systems 104a, 104b. Each of the buses 122a, 122b can communicatively couple one or more components of the computing systems 104a, 104b.

FIG. 2 also illustrates the cloud application 116 comprised in the memory 108 of the server system 102 and the client applications 128a, 128b respectively comprised in the memories 120a, 120b of the computing systems 104a, 104b. The cloud application 116 stored in the memory 108 can configure the processor 105 to manage and provide a cloud service accessible by the client applications 128a, 128b. The cloud application 116 can include one or more modules for storing, modifying, providing, or otherwise using assets in a cloud service accessed by the client applications 128a, 128b. A non-limiting example of a cloud application 116 is Adobe® Creative Cloud server software.

Each of the client applications 128a, 128b can include one or more software modules for establishing communication with a cloud application 116. Each of the client applications 128a, 128b can also include one or more software modules for performing functions in addition to establishing communication with the cloud application 116. For example, each of the client application 128a, 128b can be an image manipulation application having a software module for communicating with the cloud application 116. In some embodiments, each of the client application 128a, 128b can be a different type of application including different functionality. For example, a client application 128a can be Adobe® Ideas and a client application 128b can be Adobe® Illustrator. In some embodiments, the client applications 128a, 128b can be stand-alone applications. In other embodiments, the client applications 128a, 128b can be embedded in another application, such as an image manipulation application.

The server system 102 can include any suitable computing system for hosting the cloud application 116. In one embodiment, the server system 102 may be a single computing system, such as a server system. In another embodiment, the server system 102 may be a virtual server implemented using a number of computing systems connected in a grid or cloud computing topology.

The computing systems 104a, 104b can include any suitable computing device or system for communicating via a data network 106 and executing the client applications 128a, 128b. Non-limiting examples of a suitable computing device or system include a desktop computer, a tablet computer, a smart phone, or any other computing device or system suitable for using electronic content.

An input device 103 can include a processor 130 and a memory 132. The processor 130 can execute instructions stored in the memory 132. The memory 132 can include an I/O module 134. The I/O module 134 can establish communications with one or more of the computing systems 104a, 104b. The input device 103 can communicate with the computing systems 104a, 104b over the data network 106 or another wireless network, such as a Bluetooth network, via a transceiver 136 or other suitable communication device. A non-limiting example of an input device 103 is a stylus or other device configured to provide a touch input or other input to computing systems 104a, 104b.

In some embodiments, the memory 132 and I/O module 134 can be implemented as firmware. As used herein, the term "firmware" is used to refer to one or more operating instructions for controlling one or more hardware components of a device. Firmware can include software embedded on a hardware device. A firmware module or program can communicate directly with a hardware component, such as the processor 130 of the input device 103, without interacting with the hardware component via an operating system of the hardware device.

Figure 3:
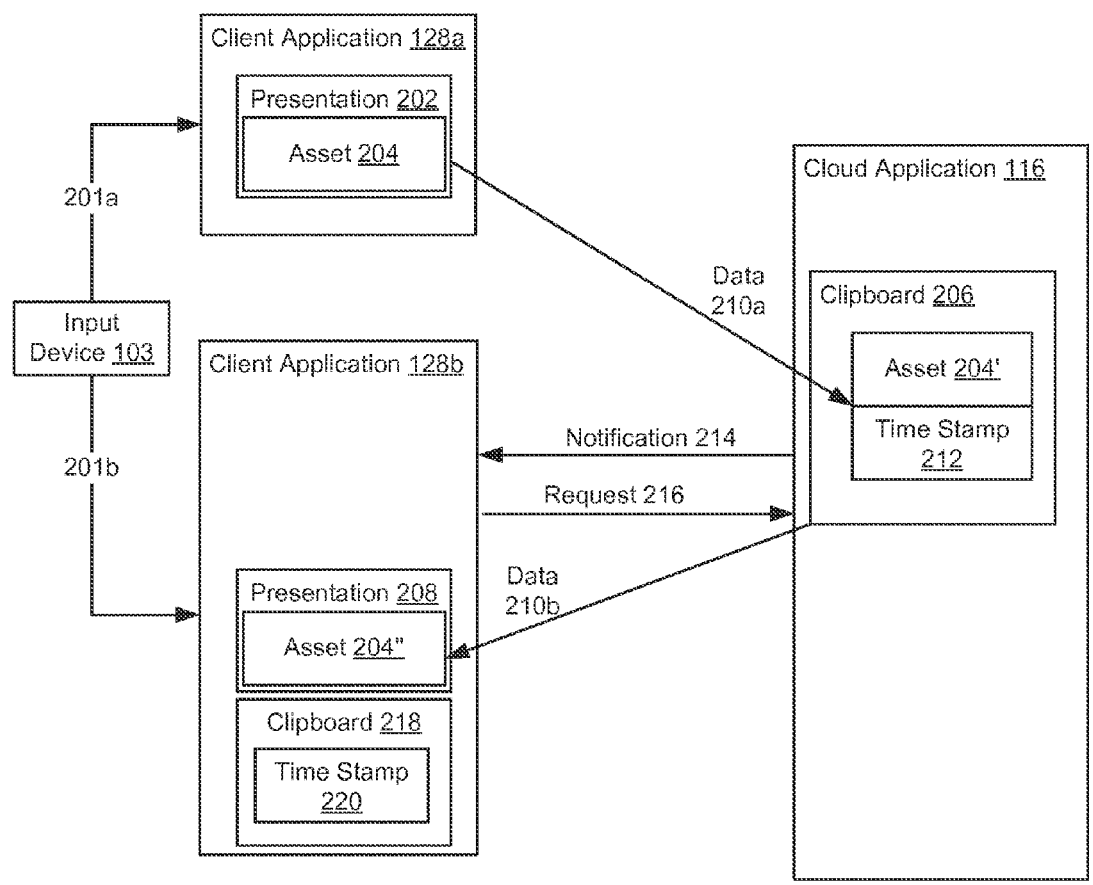
FIG. 3 is a modeling diagram depicting an example flow of communications among the cloud application providing a server-based clipboard and client applications accessing the server-based clipboard.

FIG. 3 is a modeling diagram depicting a flow of communications among the cloud application 116 providing a server-based clipboard 206 and client applications 128a, 128b accessing the server-based clipboard 206.

In some embodiments, the client applications 128a, 128b can be executed on different computing systems 104a, 104b, as depicted in FIG. 2. In other embodiments, the client applications 128a, 128b can be executed on a common computing system (e.g., a single computing device such as a tablet computer). Client applications 128a, 128b that execute on a common computing system may be unable to directly communicate via the resources of the computing system. For example, one or both of the client applications 128a, 128b may be sandboxed from one another such that at least one of the client applications 128a, 128b cannot access a clipboard stored in a memory device local to the common computing system.

The client application 128a can receive input data 201a identifying that an asset 204 provided in a presentation 202 via the client application 128a is to be copied. The input data 201a can be generated in response to a touch input by the input device 103 to a computing device at which the client application 128a is executing, such as the computing system 104a. A non-limiting example of the asset 204 is vector graphics data from a multimedia presentation or other output presentation provided by the client application 128a.

The client application 128a can serialize the selected asset 204 for communication to the cloud application 116. Serializing the selected asset 204 can include formatting the asset for transmission via a network connection. One non-limiting of serializing asset data for transmission includes converting the asset data into an FXG format. Another non-limiting example of serializing an asset is converting the asset into packetized data for transmission via a network 106. In a non-limiting example, the client application 128a can format a copy of the select asset as an FXG file. The client application 128a can transmit the serialized data representing the asset 204 to the cloud application 116. In a non-limiting example, the client application 128a can asynchronously transmit the serialized data for the asset 204.

The client application 128a can coordinate with the cloud application 116 regarding a copy operation in response to the client application 128a receiving the input data 201a. The cloud application 116 can receive the serialized data 210a representing the asset 204 via a connection between the client application 128a and the cloud application 116 over a data network 106. The cloud application 116 can store the serialized data 210a as a copied asset 204' to the server-based clipboard 206. A non-limiting example of storing the copied asset 204' to the server-based clipboard 206 is performing a memory caching operation.

In some embodiments, the cloud application 116 can broadcast or otherwise transmit a notification message 214 to one or more applications subscribing to a cloud service provided by the cloud application, such as the client application 128b. The notification message 214 can notify the client application 128b and/or other subscribing applications that the asset 204' is available from the server-based clipboard 206. In other embodiments, no notification message may be provided.

In some embodiments, the notification message 214 can include any message suitable for transmission or broadcast via a protocol for real-time or near real-time communication, such as (but not limited to), an instant messaging protocol. For example, the use of a protocol for real-time or near real-time communication can allow the process of sending the 204 from the client application 128a, notifying the client application 128b, and retrieving the asset from the server-based clipboard 206 to be performed in 1-2 seconds. A non-limiting example of a notification message is an Extensible Messaging and Presence Protocol ("XMPP") message.

The client application 128b can initiate a paste operation from the server-based clipboard 206 in response to receiving input data 201b. The input data 201b can be generated in response to a touch input by the input device 103 or another device to a computing device at which the client application 128a is executing, such as the computing system 104b. The client application 128b can retrieve the asset 204' from the server-based clipboard 206 by transmitting a request 216 for the asset and receiving serialized data 210b representing the asset 204'. Retrieving the asset 204' can include using and/or storing the copied asset 204" received from the cloud application 116 via serialized data 210b in a local memory. For example, a client application 128b executed on a computing system 104b can configure a processor 118b to store the asset in the memory 120b.

The cloud application 116 and the client application 128b can communicate the notification message 214, the request 216, and the serialized data 210b via a connection between the client application 128b and the cloud application 116 over a data network 106. In some embodiments, a first connection over the data network 106 between the client application 128a and the cloud application 116 can be active during at least some of the same time period that a second connection over the data network 106 between the client application 128a and the cloud application 116 is active. In other embodiments, a first connection between the client application 128a and the cloud application 116 can be active during a different time period than when a second connection over the data network 106 between the client application 128a and the cloud application 116 is active.

In additional or alternative embodiments, the client application 128a can include a time stamp 212 with the asset 204'. The time stamp 212 can identify a time and/or date associated with the client application 128a copying the asset 204 to the server-based clipboard 206 as asset 204'. In some embodiments, the client application 128a can transmit the time stamp 212 to the cloud application 116 in the serialized data 210a. In other embodiments, the cloud application 116 can generate the time stamp 212 in response to the cloud application 116 receiving the serialized data 210a. The asset 204' can be stored to the server-based clipboard 206 with the time stamp 212. In some embodiments, the client application 128b may be able to access a local clipboard 218 having a local time stamp 220. The client application 128b can determine that the local time stamp 220 is older than the time stamp 212 retrieved from the cloud application. The comparison of the time stamp 212 and the local time stamp 220 may be performed in response to a pasting operation executed by the client application 128b. The client application 128b can select the asset 204' for pasting into the client application 128b based on the time stamp 212 indicating a more recent time and/or date than the local time stamp 220. In additional or alternative embodiments, the client application 128b can overwrite data stored in the local clipboard 218 with the asset 204" based on the time stamp 212 indicating a more recent time and/or date than the local time stamp 220.

Although FIG. 3 depicts the client application 128b pasting the asset 204" into a pre-existing presentation 208, other implementations are possible. For example, the client application 128b can generate a new presentation in response to the input data 201b being received. The asset 204" can be pasted into the new presentation. Assets may be used in presentations and/or other types of electronic content.

Figure 4:
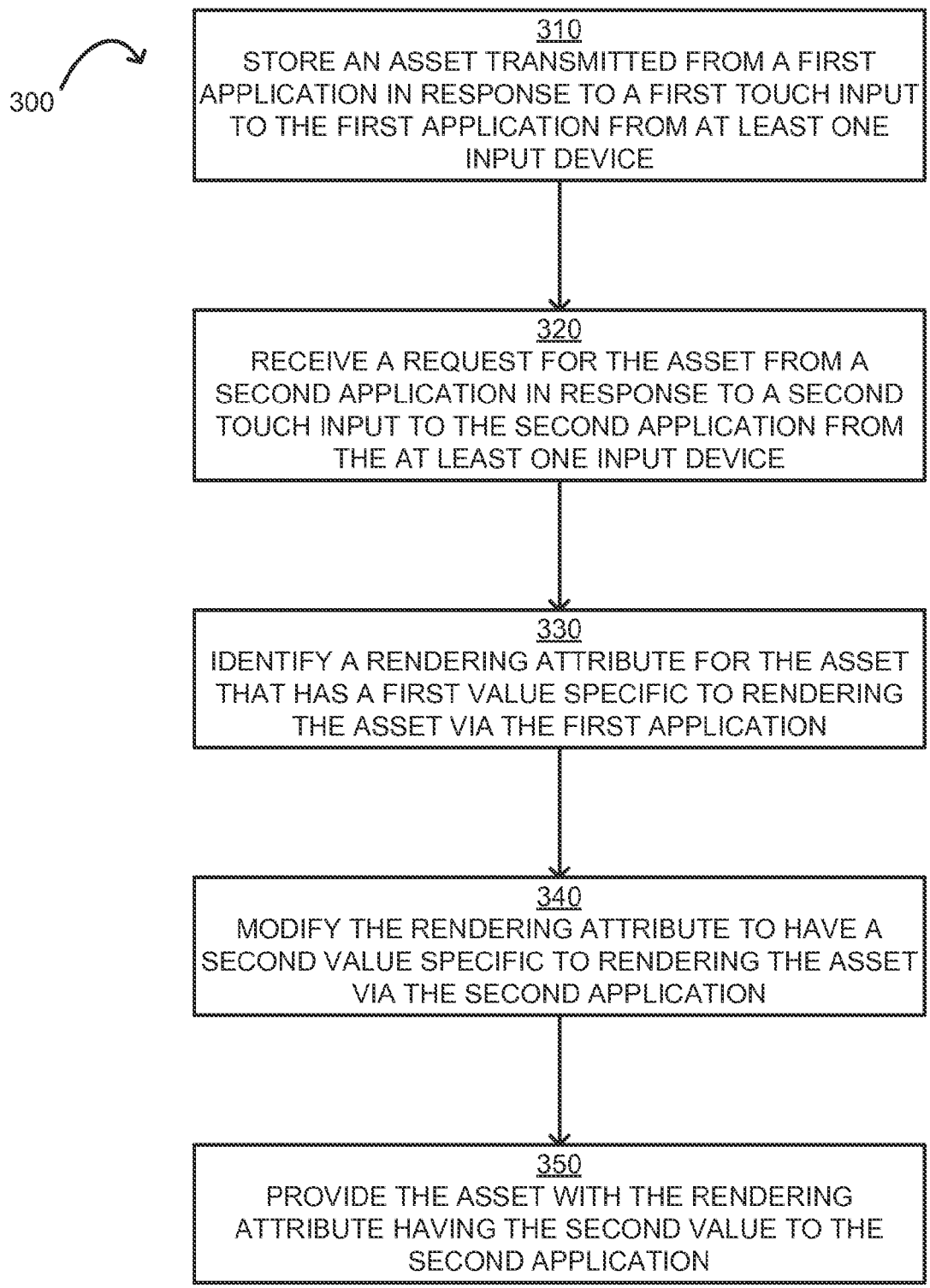
FIG. 4 is a flow chart illustrating an example method for providing a server-based clipboard.

In some embodiments, the cloud application 116 can perform one or more operations on the copied asset 204" before providing the copied asset 204" to the client application 128b. For example, FIG. 4 is a flow chart illustrating an example method 300 for providing a server-based clipboard. For illustrative purposes, the method 300 is described with reference to the system implementations depicted in FIG. 2 and the flow of communication depicted in FIG. 3. Other implementations, however, are possible.

The method 300 involves storing an asset transmitted from a first application in response to a first touch input or other input to the first application from at least one input device, as shown in block 310. For example, the processor 105 of the server system 102 can execute the cloud application 116 to store an asset transmitted to the server system 102 from a client application 128a in response to a touch input or other input to the client application 128a from the input device 103.

The method 300 further involves receiving a request for the asset from a second application in response to a second touch input or other input to the second application from the input device, as shown in block 320. For example, the cloud application 116 can receive a request from a client application 128b in response to a touch input or other input to the client application 128b from the input device 103.

The method 300 further involves identifying a rendering attribute for the asset having a first value that is specific to rendering the asset via the first application, as shown in block 330. For example, the cloud application 116 can identify a rendering attribute of the asset 204 specific to the rendering of the asset 204 by the client application 128a.

In some embodiments, the cloud application 116 can identify the rendering attribute having the first value based on metadata describing the asset 204. Metadata describing the asset 204 can be transmitted to the cloud application 116 in the serialized data 210a. For example, the metadata can identify rendering attributes such as the dimensions or resolution of a display device 126a on which the asset 204 is rendered by the copying client application 128a, one or more color values for the asset 204, an operating system of the computing system 104a at which the copying client application 128a is executed, a type of graphics data (e.g., vector graphics or raster graphics) used by the client application 128a, etc.

The method 300 further involves modifying the rendering attribute to have a second value that is specific to rendering the asset via the second application, as shown in block 340. For example, the cloud application 116 can modify the rendering attribute to have a value specific to the rendering of the asset 204 by the client application 128b.

In some embodiments, the rendering attribute includes a scaling factor. The first value is a first scaling value of the scaling factor that is used by a first application, such as the client application 128a, to render the asset 204 for display. The second value is a second scaling value of the scaling factor that is used by a second application, such as the client application 128a, to render the asset 204 for display.

In additional or alternative embodiments, the rendering attribute includes a color attribute of the asset. The first value can include a first color value of the color attribute that is used by a first application, such as the client application 128a, to render the asset 204 for display. The second value can include a second color value of the color attribute that is used by a second application, such as the client application 128b, to render the asset 204 for display. For example, the cloud application 116 can determine that rendering the asset 204 for display by the client application 128a using the first color value for the color attribute may provide a desired rendering of the asset 204 and that rendering the asset 204 for display by the client application 128b using the first color value for the color attribute may provide an erroneous or otherwise undesirable rendering of the asset 204. The cloud application 116 can modify the color attribute to have a second color value that reduces or prevents erroneous or otherwise undesirable rendering by performing a color correction operation on the asset 204' to generate the copied asset 204" having the second color value for the color attribute.

In additional or alternative embodiments, the rendering attribute includes a color scheme for the asset. The color scheme can include multiple color attributes. Each of the color attributes can have a respective color value. Modifying the rendering attribute to have the second value can include generating the copied asset 204" from the asset 204' such that the copied asset 204" has a modified color scheme with one or more different color values for one or more color attributes as compared to the asset 204 as rendered by the client application 128a.

In additional or alternative embodiments, the cloud application 116 can modify an asset 204 for transfer between computing systems 104a, 104b based on characteristics specific to the computing systems 104a, 104b. For example, the cloud application 116 can identify that the computing systems 104a, 104b are respectively executing the client applications 128a, 128b. The cloud application 116 can identify a first value of a rendering attribute based on a value of the rendering attribute set by or used by the client application 128a. The cloud application 116 can modify the rendering attribute to have the second value based on the second application being executed at the second computing device.

In one non-limiting example, the rendering attribute can be based on at least one dimension of a display screen, such as a height and/or width. The first value can include data describing the height and/or width of a display screen of a first computing device, such as a display device 126a of a computing system 104a. The cloud application 116 can identify that a second computing device, such as the computing system 104b, includes a display device 126b having a different height and/or width than the display device 126a of a computing system 104a. The cloud application 116 can modify one or more of a scaling factor of the asset 204, an aspect ratio of the asset 204, or any other attribute of the asset 204 to improve the display the asset 204 based on one or more dimensions of the display device 126b of a computing system 104b performing a pasting operation.

In another non-limiting example, the rendering attribute can be based on a resolution provided by a display device. The first value can include data describing the resolution of a display screen of a first computing device, such as a display device 126a of a computing system 104a. The cloud application 116 can identify that a second computing device, such as the computing system 104b, includes a display device 126b having a different resolution than the display device 126a of a computing system 104a. The cloud application 116 can modify one or more of a scaling factor of the asset 204, an aspect ratio of the asset 204, or any other attribute of the asset 204 to improve the display the asset 204 based on the resolution of the display device 126b of a computing system 104b performing a pasting operation.

In another non-limiting example, the rendering attribute can be based on an operating system provided by a display device. The first value can include data describing the operating system of a display screen of a first computing device, such as a display device 126a of a computing system 104a. The cloud application 116 can identify that a second computing device, such as the computing system 104b, includes a display device 126b having an operating system the display device 126a of a computing system 104a. The cloud application 116 can modify one or more of a scaling factor of the asset 204, an aspect ratio of the asset 204, or any other attribute of the asset 204 to improve the display the asset 204 based on the operating system of the display device 126b of a computing system 104b performing a pasting operation.

In some embodiments, the cloud application 116 can determine a second value for the rendering attribute that is specific to the client application 128b by referencing a data file stored in the memory 108 of the server system 102. The data file can describe characteristics of the pasting client application 128b and/or the computing system 104b at which the client application 128b is executed, such as color information, type of graphics used, screen dimensions, screen resolution, etc. The cloud application 116 can modify the value of the rendering attribute based on the description of the client application 128b and/or the computing system 104b in the data file. In additional or alternative embodiments, the cloud application 116 can request or otherwise receive desirable values of the rendering attribute from the client application 128b and/or the computing system 104b via a connection over the data network 106.

The method 300 further involves providing the asset to the second application, as shown in block 350. The provided asset has the rendering attribute with the second value specific to the second application. For example, the cloud application 116 can provide the asset 204 with the rendering attribute as modified by the cloud application 116 to the client application 128b.

Figure 5:
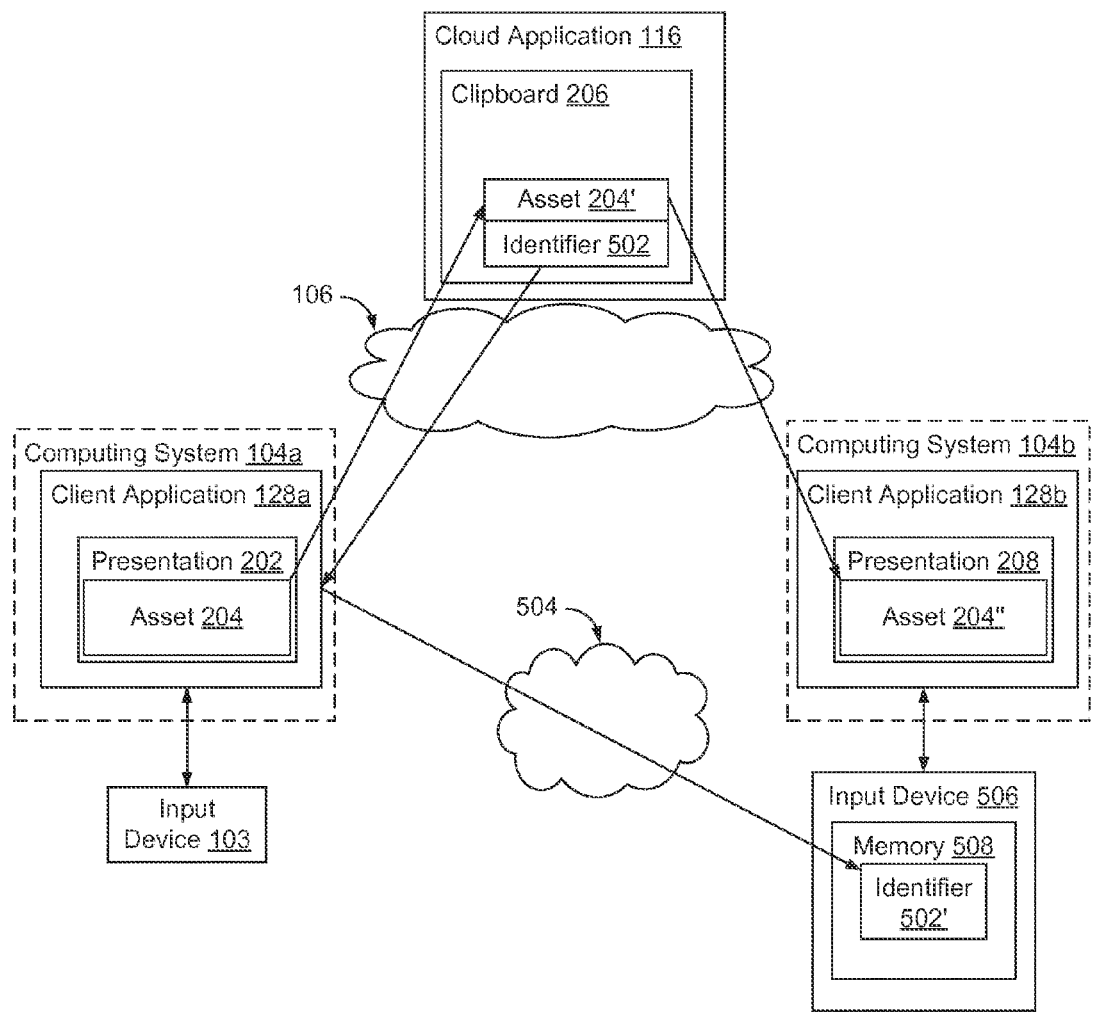
FIG. 5 is a modeling diagram depicting an example flow of communications between a computing system copying an asset to a server-based clipboard 206 and providing a network location of the copied asset to a second computing system.

In additional or alternative embodiments, a computing device performing a copying operation can provide an asset to a server-based clipboard 206 and notify neighboring devices of the location of the location of the asset on the clipboard. For example, FIG. 5 is a modeling diagram depicting a flow of communications between a computing system 104a copying an asset 204 to a server-based clipboard 206 and providing a network location of the copied asset 204' to a second computing system 104b. A computing 104a executing a client application 128a can copy an asset 204 to the server-based clipboard 206 in response to a touch input or other input from an input device 103, as described above with respect to FIG. 3. The asset 204 can be copied to the server-based clipboard 206 via the data network 106. The client application 128a can obtain an identifier 502 for the asset 204', such as a network identifier or other unique identifier. The asset 204' can be stored at the server-based clipboard 206 at a location that can be referenced by the identifier. A non-limiting example of an identifier for the asset 204' is a URL referencing asset 204' as stored in the server-based clipboard 206.

The computing system 104a can access a second data network 504, such as (but not limited to) a Bluetooth or other wireless network. The client application 128a can cause the computing system 104a to scan the data network 504 to discover or otherwise identify other input devices, such as an input device 506. The input device 506 can communicate with other computing devices, such as the computing system 104b executing a client application 128b.

The client application 128a can provide identifier 502 for the asset 204' to the input device 506. Providing the identifier for the asset 204' can include, for example, writing the identifier 502' that is a copy of the identifier 502 to a local memory 508 of the input device 506. In some embodiments, the client application 128a can provide the identifier 502 to the input device 506 via a connection over the data network 504 between the input devices 103, 506. In other embodiments, the client application 128a can provide the identifier 502 to the input device 506 via a connection over the data network 504 between the input device 506 and a network communication device of the computing system 104a, such as a wireless network transceiver.

Although FIG. 5 depicts providing an identifier for a copied asset to a single discovered input device, the identifier for a copied asset can be provided to any number of additional input devices that can be discovered or otherwise identified on a wireless network.

Any suitable process can be used for retrieving the asset via the identifier 502 provided by an application performing a copying operation. In some embodiments, the cloud application 116 may verify that the client application 128b is authorized to retrieve the asset from the server-based clipboard 206 based on the computing system 104b having the identifier 502. For example, the computing system 104b may obtain the identifier 502 from the input device 506 via a touch input or other input from the input device 506 initiating a pasting operation. The client application 128b executing at the computing system 104b may request the asset 204' from the server-based clipboard 206 in response to the touch input or other input from the input device 506. The request for the asset 204' may include the identifier 502. The cloud application 116 may verify that the client application 128b is authorized to retrieve the asset from the server-based clipboard 206 based on the client application 128b providing the identifier 502 in the request for the asset.

In some embodiments, one or more encryption processes can be used in communicating the identifier to other discoverable computing devices and/or discoverable input devices. Non-limiting examples of such encryption procedures are described in commonly assigned U.S. patent application Ser. No. 13/840,746, entitled "Secure Cloud-Based Clipboard For Touch Devices," by Dowd et al.

Figure 6:
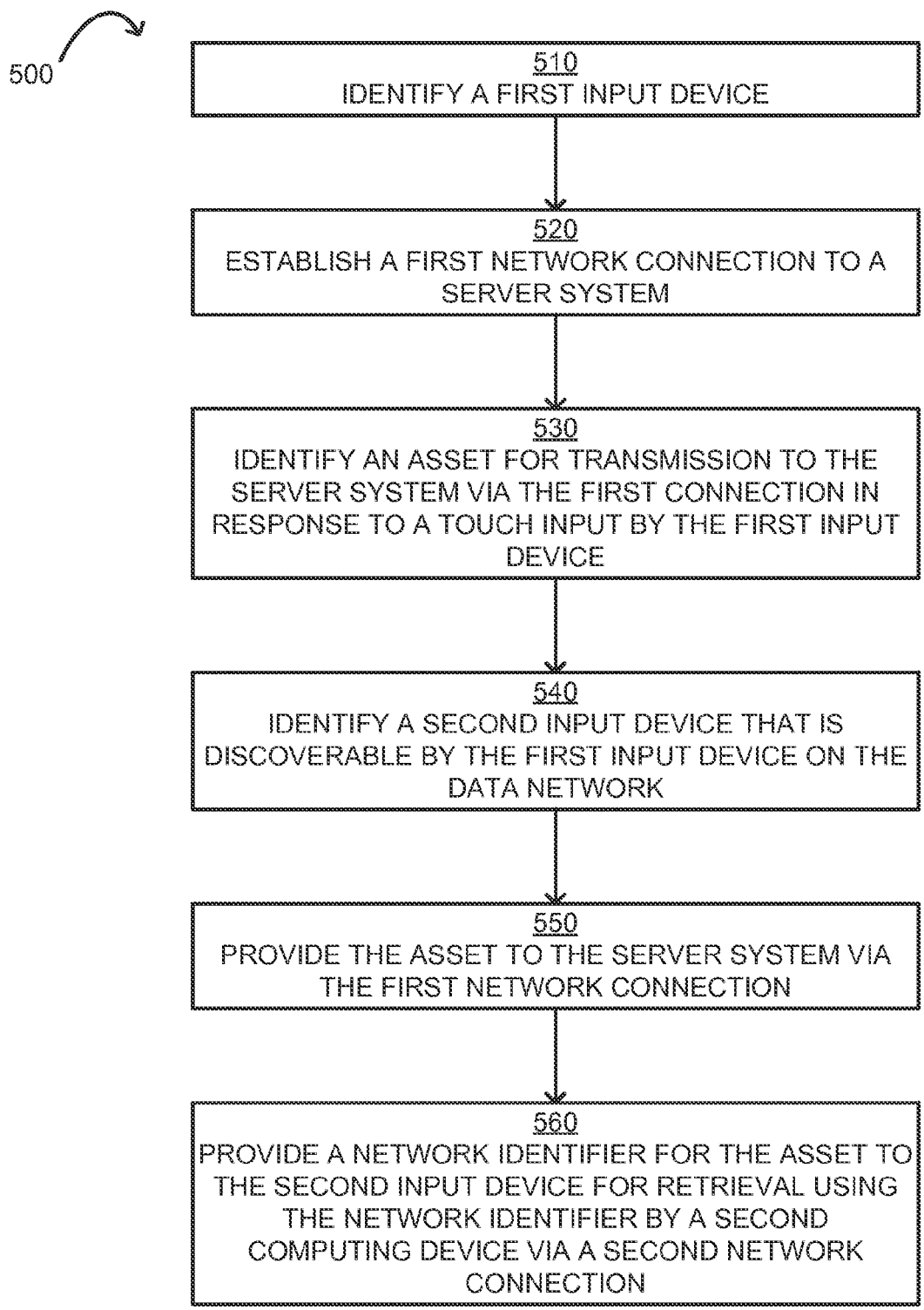
FIG. 6 is a flow chart illustrating an example method for providing assets or other electronic content to a server-based clipboard.

FIG. 6 is a flow chart illustrating an example method 500 for providing assets or other electronic content to a server-based clipboard. For illustrative purposes, the method 500 is described with reference to the system implementations depicted in FIG. 2 and the flow of communication depicted in FIGS. 3 and 5. Other implementations, however, are possible.

The method 500 involves identifying a first input device in communication with a computing device, as shown in block 510. For example, a client application 128a executing on a computing system 104a can identify an input device 103 that is in communication with the computing system 104a. The communication between the input device 103 and the computing system 104a may be effected by establishing a Bluetooth or other wireless connection with the input device 103.

The method 500 further involves establishing a first network connection between a server system and the computing device, as shown in block 520. For example, the client application 128a can establish a connection via a data network 106 with a cloud application 116 executing on a server system 102.

The method 500 further involves identifying an asset for transmission to the server system via the first connection, as shown in block 530. The identified asset is rendered by a first application executed at the computing device. For example, as described above with respect to FIG. 3, the client application 128a executing on the computing system 104a can receive a touch input or other input from the input device 103. The touch input or other input can identify an asset 204 to be copied to the server-based clipboard 206 provided by the cloud application 116.

The method 500 further involves identifying a second input device that is discoverable by the first input device on the data network, as shown in block 540. For example, the client application 128a executing on the computing system 104a can scan a data network 504 to discover or otherwise identify additional an additional input devices, such as an input device 506, accessible via the data network 504.

The input device 506 can be discovered or otherwise identified by any suitable device or process. In some embodiments, the client application 128a or another application executing on the computing system 104a can identify the input device 506 by identifying a second computing system 104b accessing the data network 504 and determining that the input device 506 is in communication with the computing system 104b. In other embodiments, the client application 128a or another application executing on the computing system 104a can identify the input device 506 by determining that the input device 506 accessing the data network 504 without regard to whether a computing system 104b or other computing device in communication with the input device 506 is accessing the data network 504. For example, the input device 506 may be configured to broadcast or otherwise transmit its presence to other input devices and/or other computing devices via a Bluetooth network or other personal area network. In other embodiments, the input device 103 can discover or otherwise identify the input device 506. In one example, the input device 103 can notify the client application 128a or another application executed on the computing system 104a that the input device 506 is available in response to a query to the input device 103 from the computing system 104a. In one example, the input device 103 can "push" a notification to the client application 128a or another application executed on the computing system 104a that the input device 506 is available without a query from the computing system 104a.

In some embodiments, identifying the input device 506 can include obtaining a network identifier other unique identifier for one or more computing systems in communication with the second input device, such as a computing system 104b. One non-limiting example of a network identifier is a URL identifying a client application 128b executed on a computing system 104b that is in communication with the second input device. Another non-limiting example of a network identifier is a media access control ("MAC") address for the input device 506. Another non-limiting example of a network identifier is an internet protocol ("IP") address or MAC address for the computing system 104b that is in communication with the input device 506.

The method 500 further involves providing the asset to the server system via the first connection, as shown in block 550. For example, the client application 128a executing on the computing system 104a can transmit the asset 204 to the cloud application 116 as described above with respect to FIG. 3. The client application 128a can obtain a network identifier 502 for the asset 204' as stored on the server-based clipboard 206.

The method 500 further involves providing a network identifier for the asset to the second input device, as shown in block 560. The asset is retrievable using the network identifier by a second computing device in communication with the second input device via a second connection. For example, the client application 128a executing on the computing system 104a can provide a network identifier 502 to the input device 506 as described above with respect to FIG. 5.

One or more of blocks 530-560 can be performed in responsive to the touch input or other input by the input device 103.

Figure 7:
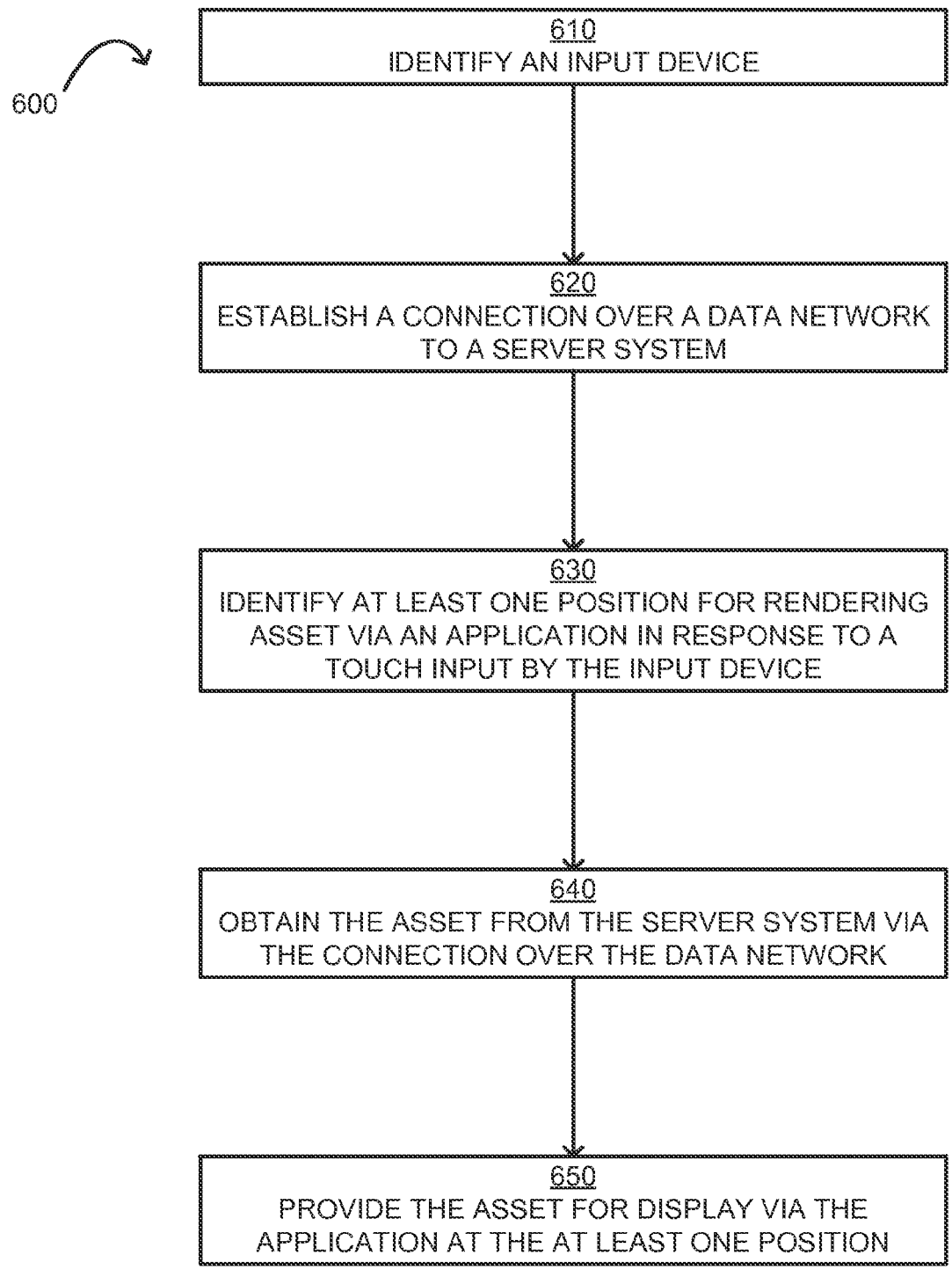
FIG. 7 is a flow chart illustrating an example method for retrieving assets or other electronic content from a server-based clipboard.

FIG. 7 is a flow chart illustrating an example method 600 for retrieving assets or other electronic content from a server-based clipboard. For illustrative purposes, the method 500 is described with reference to the system implementations depicted in FIG. 2 and the flow of communication depicted in FIG. 3. Other implementations, however, are possible.

The method 600 involves identifying an input device in communication with a computing device, as shown in block 610. For example, a client application 128b executing on a computing system 104b can identify an input device 103 in communication with the computing system 104b.

The method 600 further involves establishing a connection over a data network between the server system and the computing device, as shown in block 620. For example, the client application 128b can establish a connection via a data network 106 with a cloud application 116 executing on a server system 102.

The method 600 further involves identifying at least one position for rendering an asset via an application executed at the computing device, as shown in block 630. For example, the client application 128b can receive a touch input or other input from the input device 103. The touch input or other input can specify a paste operation to be performed by the client application 128b. The paste operation can add an asset 204 stored on a clipboard 206 provided by the cloud application 116 to a document or other output presentation being accessed by the client application 128b. The client application 128b can identify a position for the asset 204 to be displayed in the document or other output presentation based on the touch input or other input.

In some embodiments, the position for the asset 204 can be determined based on a location of the touch input or other input on a display device of the computing system performing the pasting operation. For example, a touch input or other input at a given position in a plane provided by a display screen of the display device 126b can specify the position at which the asset 204 will be pasted in the client application 128b.

In other embodiments, the position for the asset 204 at a device or application performing a pasting operation can be determined based on a location of a touch input or other input at a device or application performing a copying operation. For example, the client application 128b can identify that the client application 128b is an active application based on input data 201b selecting the client application 128b. The client application 128b can identify the position of the input data 201a associated with a copying operation by the client application 128a. For example, the client application 128b can request or otherwise retrieve data from the cloud application 116 identifying a position of the input data 201a that resulted in the copied asset 204' being stored to the server-based clipboard 206. The client application 128b can determine a relationship between a first value of a rendering attribute for the asset 204 as displayed by the client application 128a and a second value of the rendering attribute for the asset 204" as displayed by the client application 128b. The client application 128b can determine a position of the asset 204" as rendered by the client application 128b based the relationship between the first and second values of the rendering attribute.

In one non-limiting example, the relationship between a first and second value of a rendering attribute can be a relationship between one or more dimensions of a display device 126a and one or more corresponding dimensions of the display device 126b. For example, the width of display device 126a may be one-third of the width of display device 126b and the height of display device 126a may be one-half of the height of display device 126b. The input data 201a may identify a point having coordinates (x, y) in an x-y plane corresponding to a screen of the display device 126a. A point having coordinates (x, y) on the display device 126a may correspond to a point having coordinates (3x, 2y) on the display device 126b based on the display device 126b having a screen that is thrice as wide and twice as tall as the display screen of the display device 126a.

In some embodiments, the position for the asset 204 can include a position in a plane corresponding to a touch surface provided by the display device 126b. In one non-limiting example, the position can be a position in an X-Y plane corresponding to a touch surface provided by the display device 126b. In another non-limiting example, the position can be a position in a three-dimensional touch volume provided by the display device 126b.

The method 600 further involves obtaining the asset from the server system via the connection over the data network, as shown in block 640. For example, the client application 128b can retrieve a copy of the asset 204 stored on the server-based clipboard 206 provided by the cloud application 116.

The method 600 further involves providing the asset obtained from the server system for display via the application at the at least one position, as shown in block 650. For example, the client application 128b can render the asset retrieved from the clipboard for display in or with a document or other output presentation provided by the client application 128a. In some embodiments, the document or other output presentation can be a pre-existing document or other output presentation being accessed by the client application 128b. In other embodiments, the client application 128b can generate a new document or other output presentation that includes the asset 204.

One or more of blocks 530-550 can be performed in responsive to a touch input by the input device 103.

Figure 8:
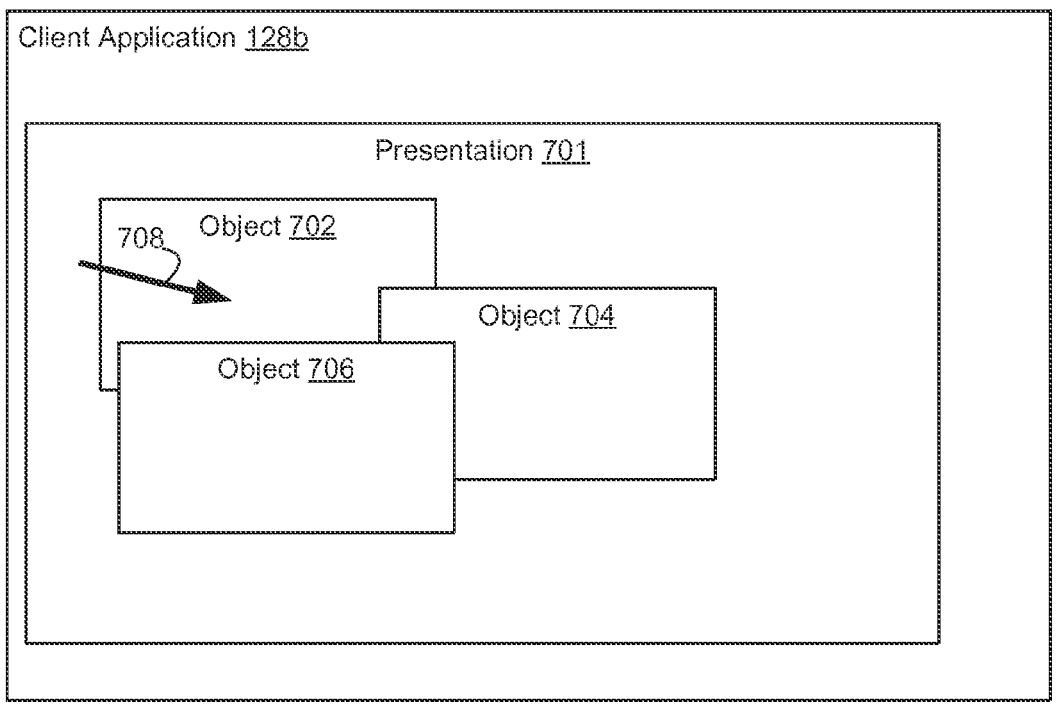
FIG. 8 is a modeling diagram depicting selection of a layer of a presentation into which an asset may be pasted.

In additional or alternative embodiments, selecting a position for an asset and providing the asset to an output presentation can include selecting a layer in a document or other output presentation in which the asset will be positioned. For example, FIG. 8 is a modeling diagram depicting selection of a layer of a presentation 701 into which an asset 204" may be pasted. The presentation 701 can include multiple layers. The presentation 701 can include objects 702, 704, 706 positioned in the various layers. For example, as depicted in FIG. 8, the object 702 is positioned in a first layer. The object 704 is positioned in a second layer. Objects in the second layer overlap objects in the first layer, as depicted in FIG. 8 by the object 704 overlapping the object 702. The object 706 can be positioned in a third layer. Objects in the third layer overlap objects in the first layer and the second layer, as depicted in FIG. 8 by the object 706 overlapping the objects 702, 704. Although FIG. 8 depicts three objects in three layers, any number of layers having any number of objects can be used.

The client application 128b can receive input 708 selecting a layer in which an asset 204" may be positioned. For example, an input 708 (depicted as an arrow in FIG. 8) can identify a layer in which object 702 is positioned. Providing an asset 710 in response to a paste operation being initiated by the input 708 can cause the asset 710 to be positioned in the same layer as object 702, as depicted in FIG. 9.

In additional or alternative embodiments, different types of touch inputs can identify a layer in which an asset is to be positioned. For example, a first type of touch input (such as, but not limited to, a single tap) can be associated with a first layer. A second type of touch input (such as, but not limited to, a double tap) can be associated with a second layer. A third type of touch input (such as, but not limited to, a long press) can be associated with a third layer. The client application 128b can identify that the asset is to be positioned in the first, second, or third layer based on the touch input respectively being either a single tap, a double tap, or a long press.

Figure 9:
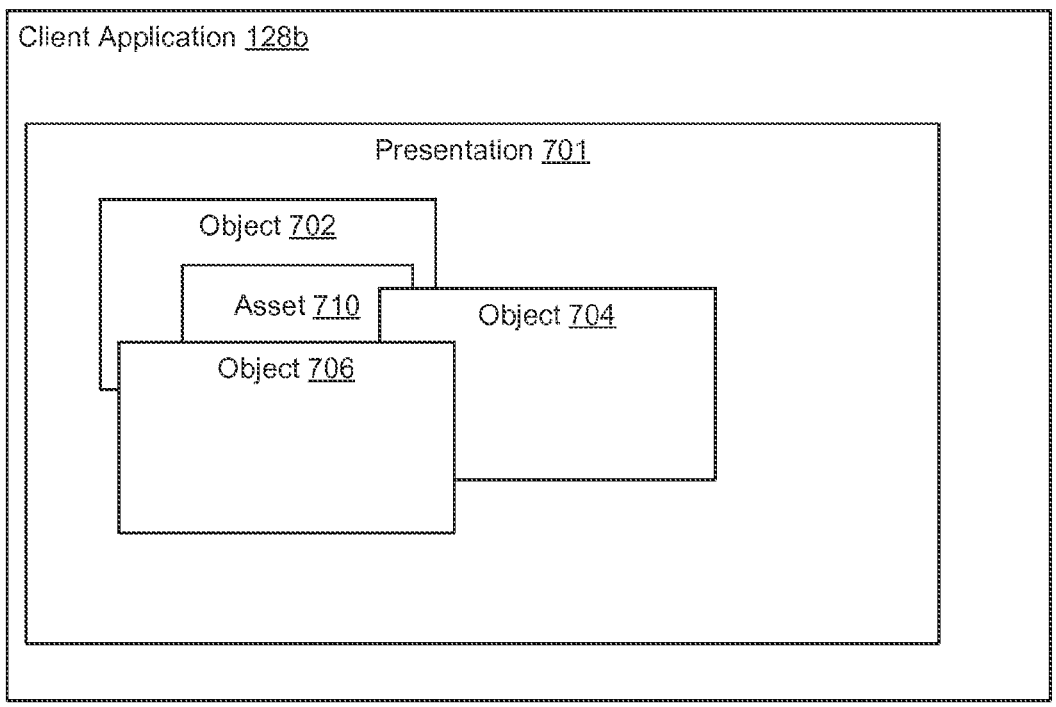
FIG. 9 is a modeling diagram depicting pasting an asset into a selected layer.
Figure 10:
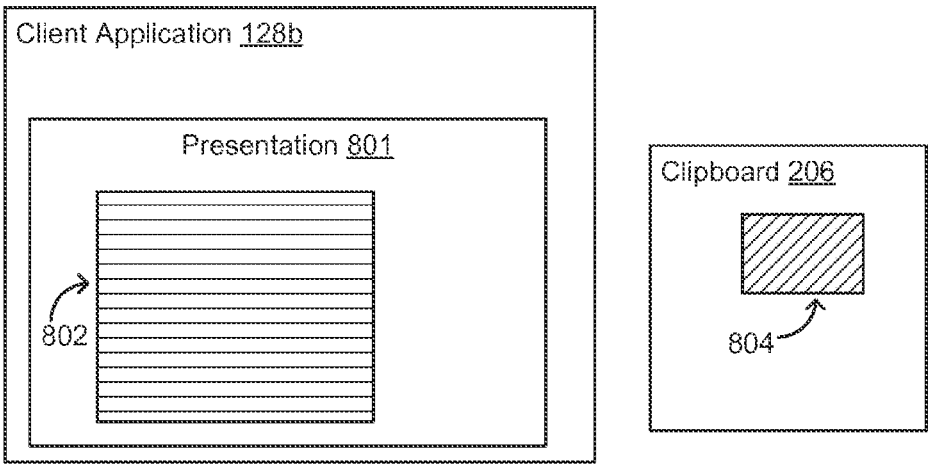
FIG. 10 is a modeling diagram depicting a presentation having content into which an asset from a server-based clipboard can be merged.
Figure 11:
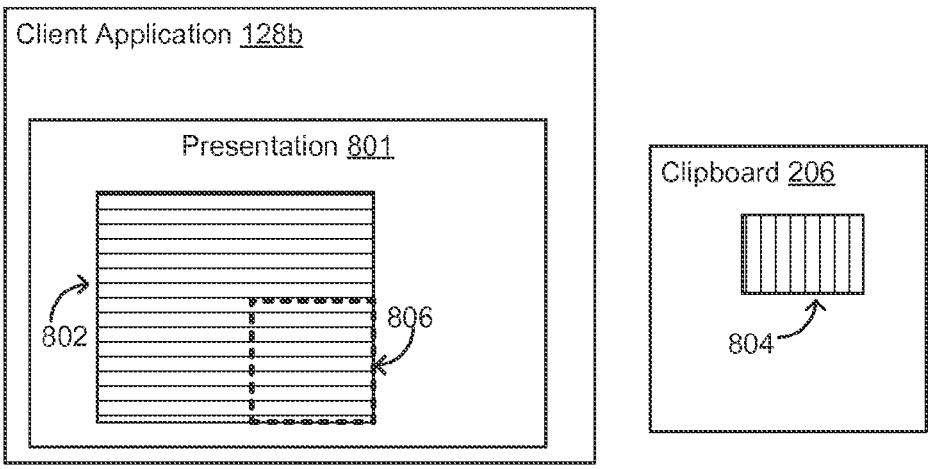
FIG. 11 is a modeling diagram depicting a input selecting a portion of the content of the presentation into which the asset from a server-based clipboard can be merged.
Figure 12:
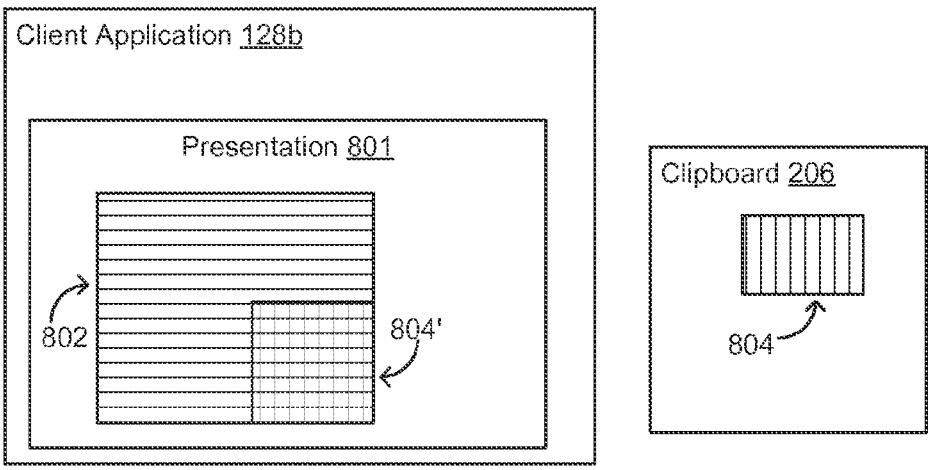
FIG. 12 is a modeling diagram of a copied asset generated from the asset being merged with the content.

In additional or alternative embodiments, an application performing a paste operation from a server-based clipboard can merge an asset retrieved from the clipboard into an existing presentation, as depicted in FIGS. 9-11. FIG. 10 is a modeling diagram depicting a presentation 801 having content 802 into which an asset 804 from a server-based clipboard 206 can be merged. Identifying a position for rendering an asset 804 can include receiving an input specifying a portion of the content 802 into which the asset 804 can be merged. For example, FIG. 11 is a modeling diagram depicting a touch input 806 selecting a portion of the content 802 of the presentation 801 into which the asset 804 from a server-based clipboard 206 can be merged. The touch input 806 can involve drawing a border around a portion of the content 802 to be merged with the asset 804. For the sake of simplicity, the touch input 806 is depicted in FIG. 11 as a rectangular shape. However, the touch input 806 can specify any shape for the region of content 802 to be merged with the asset 804. FIG. 12 is a modeling diagram of a copied asset 804' generated from the asset 804 being merged with the content 802. The merging of content 802 in the selected region with the copied asset 804' is depicted in FIG. 12 by the vertical hatching of the asset 804 overlapping the horizontal hatching of the content 802. However, any form of merging content with an asset can be used.

In some embodiments, the cloud application 116 can be modify one or more attributes of the asset 804 in generating the copied asset 804". For example, as depicted in FIG. 12, the cloud application 116 can generate a copied asset 804" that is skewed in one or more dimensions and/or scaled in order to occupy a content region identified by the touch input 806 having different dimensions than the asset 804.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A method executed by a server system, the method comprising:
  storing a first asset received from a first application, the first asset having an associated timestamp, and wherein the first application is configured to send the first asset to the server system in response to a first input to the first application from at least one input device;
  receiving a request for the first asset from a second application, wherein the second application is configured to send the request in response to a second input to the second application from the at least one input device and further in response to the first asset being newer than a second asset associated with the second application;
  in response to receiving the request for the first asset from the second application, providing the first timestamp associated with the first asset to the second application, wherein the second application is further configured to determine that the first asset is newer than the second asset based on the first timestamp being more recent than a second timestamp associated with the second asset;
  identifying a rendering attribute for the first asset, wherein the rendering attribute has a first value that is specific to rendering the first asset via the first application;
  modifying the rendering attribute to have a second value that is specific to rendering the first asset via the second application; and
  providing the first asset with the rendering attribute having the second value to the second application.

2. The method of claim 1, wherein identifying the rendering attribute comprises identifying a scaling factor, wherein the first value comprises a first scaling value of the scaling factor that is specific to the first application;
  wherein modifying the rendering attribute to have the second value comprises setting the scaling factor to a second scaling value that is specific to the second application.

3. The method of claim 1, wherein identifying the rendering attribute having the first value comprises identifying color attribute of the first asset, wherein the first value comprises a first color value of the color attribute that is specific to the first application;
  wherein modifying the rendering attribute to have the second value comprises:
  determining that the first color value is associated with an erroneous rendering of the color attribute by the second application, and
  modifying the color attribute to have a second color value preventing the erroneous rendering by performing a color correction operation on the first asset.

4. The method of claim 1, wherein identifying the rendering attribute having the first value comprises identifying color scheme comprising a plurality of color attributes for the first asset, wherein each of the plurality of color attributes has a respective first color value;
  wherein modifying the rendering attribute to have the second value comprises modifying the color scheme for rendering by the second application by modifying at least some of the plurality of color attributes to each have a respective second color value.

5. The method of claim 1, further comprising, prior to storing the asset:
identifying a first computing device executing the first application;
identifying a second computing device executing the second application;
establishing a first connection via a data network for communicating with the first computing device and a second connection via the data network for communicating with the second computing device, wherein the first asset is transmitted from the first computing device via the first connection; wherein the request is received from the second computing device and the first asset is provided to the second computing device via the second connection.

6. The method of claim 1, further comprising, prior to storing the first asset:
identifying that the first application and the second application are executed on a common computing device;
identifying that the first application and the second application cannot directly communicate via resources of the common computing device; and
based on identifying that the first application and the second application cannot directly communicate via the resources of the common computing device,
establishing a first connection with the first application and a second connection with the second application.

7. The method of claim 1, wherein identifying the rendering attribute having the first value comprises:
identifying a first computing device executing the first application, and identifying the first value of the rendering attribute based on the first application being executed at the first computing device;
wherein modifying the rendering attribute to have the second value comprises identifying a second computing device executing the second application, and modifying the rendering attribute to have the second value based on the second application being executed at the second computing device.

8. The method of claim 7, wherein the rendering attribute is based on at least one of:
at least one dimension of a display screen, wherein the first value is at least one first value of the at least one dimension on a first display screen of the first computing device and wherein the second value is at least one second value of the at least one dimension on a second display screen of the second computing device;
a resolution, wherein the first value is a value of the resolution for the first display screen and wherein the second value is a value of the resolution for the second display screen;
an operating system, wherein the first value corresponds to a first operating system for the first computing device and wherein the second value corresponds to a second operating system for the second computing device.

9. The method of claim 1, wherein the second input to the second application from the at least one input device identifies at least one position for rendering the first asset for display via the first application.

10. The method of claim 1, wherein the at least one input device comprises a stylus.

11. The method of claim 1, wherein the first application is further configured to generate and send the first timestamp to the server system in response to the first input to the first application from the at least one input device.

12. The method of claim 11, wherein the first asset comprises the first timestamp.

13. The method of claim 1, wherein the first timestamp is generated by the server system in response to receiving the first asset sent by the first application.

14. A computerized system comprising:
one or more processors; and
one or more computer storage media storing computer-usable instructions that, when used by the one or more processors, cause the one or more processors to:
store, on a server device, an asset received from a first application, the asset having a first timestamp associated therewith, and wherein the first application is configured to send the asset to the server device in response to a first input to the first application;
generate, in accordance with storing the asset, a notification message for communication with the first timestamp to at least a second application, the notification message to notify at least the second application that the asset is available;
receive, from the second application, a request for the asset, wherein the second application is configured to send the request based on a second input to the second application, a determination that the asset is newer than a second asset associated with the second application, and on receipt of the notification message, wherein the second application is further configured to determine that the asset is newer than the second asset based on the first timestamp being more recent than a second timestamp associated with the second asset;
in response to receiving the request for the asset from the second application, modify a rendering attribute for the asset from a first value to a second value, wherein the first value is specific to rendering the asset via the first application and the second value is specific to rendering the asset via the second application; and
provide the asset with the rendering attribute having the second value to the second application.

15. The system of claim 14, wherein the notification message comprises an Extensible Messaging and Presence Protocol ("XMPP") message.

16. The system of claim 14, wherein the asset received from the first application is a first set of clipboard data that is local to the first application, and wherein the second asset is a second set of clipboard data that is local to the second application.

17. A non-transitory computer storage medium storing computer-useable instructions that, when used by one or more computing devices, cause the one or more computing devices to perform operations comprising:
storing a first asset received from a first application that is in communication with a server system, the first asset having a first timestamp associated therewith, and wherein the first application is configured to send the first asset to the server system in response to a first input to the first application;
generating, in accordance with storing the first asset, a notification message for communication to at least a second application that is in communication with the server system, the notification message to notify at least the second application that the first asset is available;
after sending the notification message and the first timestamp associated with the first asset to at least the second application, receiving, from the second application, a request for the first asset, wherein the second application is configured to determine that the first asset is newer than a second asset associated with the second application based on the first timestamp being more recent than a second timestamp associated with the second asset, and wherein the second application is further configured to send the request in response to a second input to the second application, and based on the first asset being newer than the second asset associated with the second application;

identifying a rendering attribute for the first asset, wherein the rendering attribute has a first value that is specific to rendering the first asset via the first application;

modifying the rendering attribute to have a second value that is specific to rendering the first asset via the second application; and providing the first asset with the rendering attribute having the second value to the second application.

18. The medium of claim 17, wherein identifying the rendering attribute comprises identifying a scaling factor, wherein the first value comprises a first scaling value of the scaling factor that is specific to the first application;

wherein modifying the rendering attribute to have the second value comprises setting the scaling factor to a second scaling value that is specific to the second application.

19. The medium of claim 17, wherein the second input to the second application identifies at least one position for rendering the first asset for display via the second application.

20. The medium of claim 17, wherein the first timestamp is generated by one of the server system in response to receiving the first asset from the first application or the first application in response to the first input to the first application.

* * * * *